US008189522B2

(12) United States Patent
Iyer et al.

(10) Patent No.: US 8,189,522 B2
(45) Date of Patent: May 29, 2012

(54) COMMUNICATING SYSTEM INFORMATION IN A WIRELESS COMMUNICATION NETWORK

(75) Inventors: Subramanian S. Iyer, Vernon Hills, IL (US); Christopher R. Cushing, Palatine, IL (US); Ajaykumar R. Idnani, Hoffman Estates, IL (US); David R. Maas, Hoffman Esates, IL (US); J. Chris Stanaway, Wheaton, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 637 days.

(21) Appl. No.: 12/392,188

(22) Filed: Feb. 25, 2009

(65) Prior Publication Data
US 2010/0214995 A1 Aug. 26, 2010

(51) Int. Cl.
H04W 4/00 (2009.01)
H04L 12/26 (2006.01)
H04L 12/54 (2006.01)

(52) U.S. Cl. ............ 370/329; 370/252; 370/395.4; 370/338

(58) Field of Classification Search ............ 370/252, 370/254–255, 310–350, 395.2, 395.4, 432, 370/464–465
See application file for complete search history.

(56) References Cited

U.S. PATENT DOCUMENTS

| 4,817,080 | A  | * | 3/1989  | Soha ........................... 370/252 |
| 6,704,576 | B1 | * | 3/2004  | Brachman et al. .......... 455/503 |
| 7,181,170 | B2 | * | 2/2007  | Love et al. ................ 455/67.13 |
| 7,948,991 | B1 | * | 5/2011  | Hart et al. ................. 370/395.4 |
| 2007/0002811 | A1 |   | 1/2007  | Faccin et al. |
| 2007/0133484 | A1 | * | 6/2007  | Albal et al. .................. 370/338 |
| 2007/0177592 | A1 | * | 8/2007  | Mooney et al. .............. 370/390 |
| 2007/0263528 | A1 | * | 11/2007 | Mukherjee .................. 370/208 |
| 2007/0291661 | A1 | * | 12/2007 | Nishibayashi et al. ....... 370/252 |
| 2008/0069071 | A1 | * | 3/2008  | Tang ........................... 370/342 |
| 2008/0170520 | A1 | * | 7/2008  | Sim et al. .................... 370/310 |
| 2008/0170524 | A1 |   | 7/2008  | Dang et al. |
| 2008/0285668 | A1 |   | 11/2008 | Lee et al. |
| 2011/0216688 | A1 | * | 9/2011  | Katori ......................... 370/312 |

FOREIGN PATENT DOCUMENTS

WO    2008153271 A1   12/2008

OTHER PUBLICATIONS

"IEEE Standards for Local and Metropolitan Area Networks—Part 16: Air Interface for Fixed and Mobile Broadband Wireless Access Systems—Amendment 3: Management PLANe Procedure and Services; IEEE Std. 802.16g 2007 (Amendment to IEEE Std. 802.16-2004) ED—Anonymous", IEEE Standard; [IEEE Standard], IEEE, Piscataway, NJ, USA, Jan. 1, 2007, pp. 1-202.
Hultsch, Wolfgang: "The International Search Report and the Written Opinion of the International Search Authority", European Patent Office, Rijswijk, completed: Aug. 2, 2010, mailed: Aug. 9, 2010, all pages.

* cited by examiner

Primary Examiner — Warner Wong

(57) ABSTRACT

An apparatus and method for communicating system information in a wireless communication network. A first step 200 includes defining unicast threshold parameter(s). A next step 201 includes receiving a request for system information. A next step 202, 204 includes determining if the system information exceeds the threshold parameter(s). A next step 206-216 includes scheduling an ad-hoc broadcast of the system information if the system information exceeds the threshold parameter(s). A next step 218 includes sending a pointer to the scheduled ad-hoc broadcast. A next step 220 includes broadcasting the network service provider information per the schedule.

10 Claims, 2 Drawing Sheets

COMMUNICATING SYSTEM INFORMATION IN A WIRELESS COMMUNICATION NETWORK

FIELD OF THE INVENTION

The present invention relates generally to an apparatus and method for communicating system information in a wireless communication network.

BACKGROUND OF THE INVENTION

Mobile terminals or subscriber stations, by their very nature, need to determine what wireless communication networks are available to them and to which networks they may connect. i.e. Network Discovery and Selection (ND&S). For example, the WiMAX communication system (IEEE 802.16e) allows a base station to provide Network Service Provider (NSP) information to subscriber stations that it serves. This information can be sent in a specific communication (unicast) to particular subscriber stations, or can be sent in a general communication (periodic broadcast) to all available subscriber stations that the base station serves.

One problem in using unicast is that sending NSP information individually to each subscriber station (SS) requires separate messaging for each SS and is therefore wasteful of signaling air capacity. Another problem is that unicast may not be practical because of the NSP information size. For many base station configurations, the downlink frame size (which is dictated, for example, by channel bandwidth, frame ratio and coding rate) does not allow for large NSP information to be unicast because it is undesirable to use a large percentage of the frame for a single SS. However, one advantage of unicast is that latency will be minimal since a unicast may be sent immediately.

A problem with periodic broadcast is that these broadcasts occur infrequently which can result in unacceptable latency and poor user experience. This is because periodic broadcasts cannot be too frequent as it would be wasteful messaging when very few SSs are performing ND&S. For example, in the current WiMAX standard, the default for sending periodic broadcast of NSP information is every 10 seconds. Hence, the ND&S latency could be as much as ten seconds or more if only periodic broadcasting of NSP information is used. The present WiMAX standard allows for unicasts and/or periodic broadcasts, but the existing implementation of the WiMAX standard suffers from the above latency and signaling air traffic capacity problems.

What is needed is an apparatus and method that allows for a solution that provides a balance between reasonable latency and optimized use of signaling traffic capacity.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

Skilled artisans will appreciate that common but well-understood elements that are useful or necessary in a commercially feasible embodiment are typically not depicted or described in order to facilitate a less obstructed view of these various embodiments of the present invention.

DETAILED DESCRIPTION OF THE PREFERRED EMBODIMENT

The present invention provides a method and apparatus that provides a balance for providing NSP information that uses less average messaging overhead with reasonable average latency. In particular, the present invention provides the use of ad-hoc broadcast as needed to reduce latency. The use of an ad-hoc broadcast also optimizes signaling traffic over the air interface by eliminating the need to unicast a large amount of NSP information to each SS requesting that information. The present invention combines the usage of unicast, ad-hoc broadcast, and periodic broadcast to favor and optimize latency when there is low volume of NSP information traffic and to optimize other delay sensitive signaling and user data traffic capacity when there is high volume of NSP information traffic.

In an additional embodiment of the present invention, periodic broadcast may be favored to optimize other delay sensitive signaling traffic and user data traffic when there is a high volume of other delay sensitive signaling traffic and user data traffic even when there is a low volume of NSP information traffic. This allows for more over-the-air bandwidth to be allocated to other delay sensitive signaling traffic and user data traffic at the expense of additional ND&S latency.

In an additional embodiment of the present invention, unicast and ad-hoc broadcast may be favored when there is a low volume of other delay sensitive signaling traffic and user data traffic, even when there is a high volume of NSP information traffic in order to optimize ND&S latency. In this scenario, the use of unicast versus ad-hoc broadcast depends on amount of NSP information to provide and the downlink frame size. For example, in WiMAX, the unicast message which provides NSP information must fit within a single downlink frame whereas a broadcast message may span multiple downlink frames.

Figure 1:
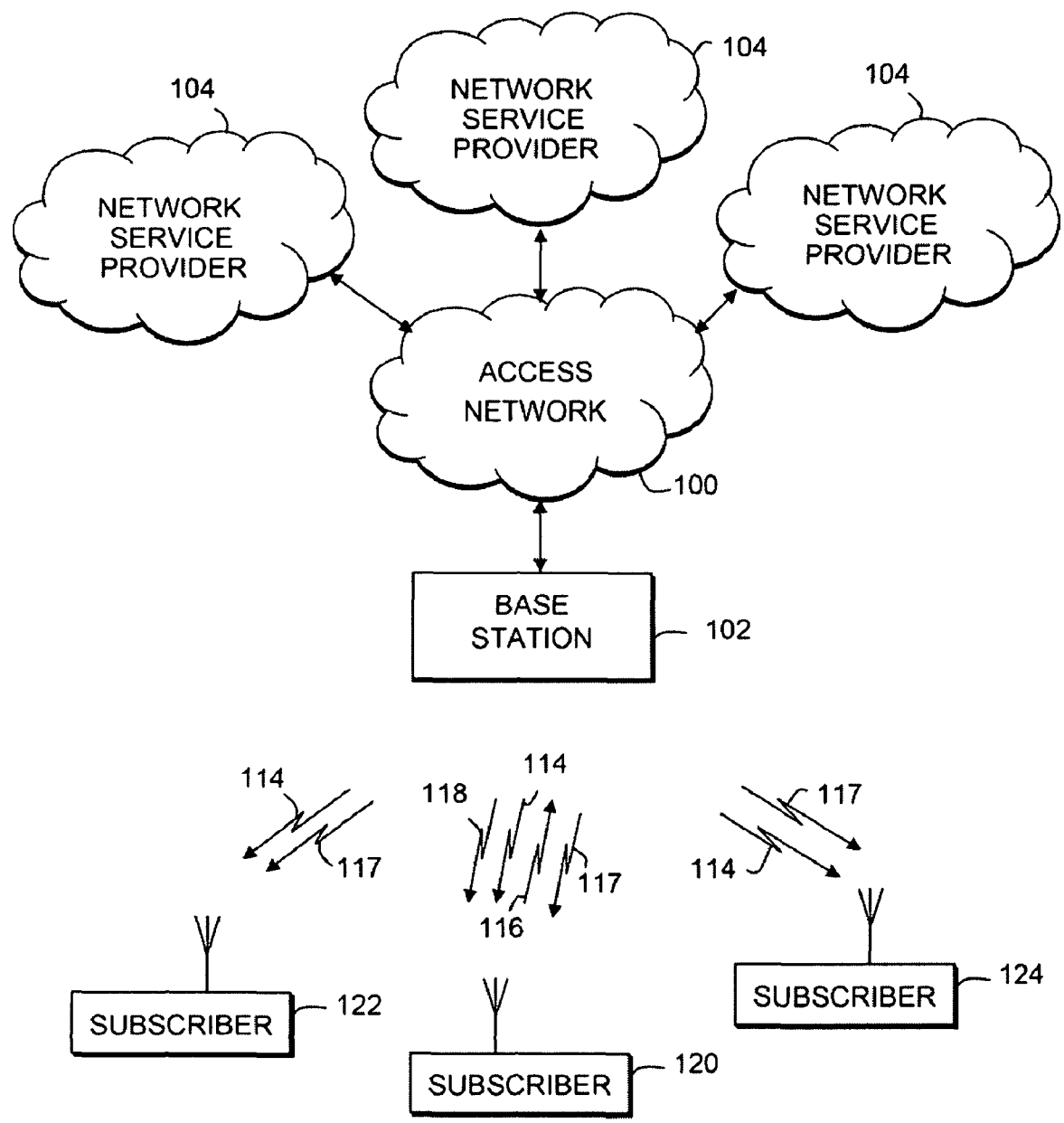
FIG. 1 illustrates a simplified block diagram of a WiMAX architecture for ND&S, in accordance with the present invention.

Referring to FIG. 1, the present invention provides for a call control architecture as can be used for a WiMAX communication network, for example. However, it should be recognized that the present invention may be equally adaptable to other communication systems, such as Long Term Evolution systems, and the like. The architecture includes a base station, NodeB, or an base station 102, as shown, that can be communicatively coupled to a plurality of mobile or fixed subscriber stations, shown here as three units 120, 122, and 124. The base station 102 allows the subscriber stations 120, 122, 124 to access services from one or more network service providers 104 through an access (services) network 100, in accordance with protocols of the communication system.

The diagram is simplified for purposes of illustrating the present invention. However, those of ordinary skill in the art will realize that many other network entities may be part of the communication system. For example, in the WiMAX architecture, the Network Service Provider equipment 104 refers to a Connectivity Services Network (CSN) consisting of a Home Agent (HA), domain name service (DNS) server, dynamic host configuration protocol (DHCP) server, authentication, authorization and accounting (AAA) server, etc. and a Network Access Provider equipment refers to an Access Services Network (ASN) consisting of Access Services Network Gateways (ASN-GWs) 100, interconnected with base stations 102.

In addition, the architecture can include many other entities which have not been shown for the sake of simplicity. For example, the architecture can include one or more of a server, a session controller, a database manager, a registration manager, an application layer router, a broadcast and unicast address manager, a policy manager, a floor controller, a media manager, and a bandwidth manager, among others, all of which are known in the art. It should be appreciated that the above described entities can be integrated in the same physical or logical network element, or provided as separate physical or logical network elements.

Referring back to FIG. 1, in a WiMAX network, for Network Discovery & Selection (ND&S), a receiver of an BS (Base station) 102 receives a query 116 from a Subscriber Station (SS) 120 for information on one or more available Network Service Providers (NSPs) 104, in a Subscriber Station Basic Capability Request (SBC-REQ), for example. The NSP information is used by the SS 120 to select a BS 102 and NSP 104 for performing Network Entry (NE). The current WiMAX standard allows the BS to unicast 118 the NSP information to a specific subscriber 120 or to provide a broadcast frame pointer to a predetermined time when the NSP information will be broadcast 117 to all available Subscriber Stations 120, 122, 124.

In contrast, the present invention firstly allows a small amount of unicast messaging 118 to be used for optimum latency in low NSP information volume scenarios. The NSP information can be unicast to a SS if the NSP information can fit in a reasonable percentage of Downlink Frame Size and if the unicast message rate is within a specified threshold.

Secondly, the present invention provides that a transmitter of the BS performs an ad-hoc broadcast 114 of NSP information as needed. The ad-hoc broadcast is scheduled by a processor of the BS when no other ad-hoc broadcast or previously scheduled periodic broadcast is scheduled as a Service Identity Information Advertisement (SII-ADV) in the next N frames, where N is set such that a specified maximum ND&S latency is achieved. If an ad-hoc broadcast is already scheduled within N frames, this indicates that another subscriber (e.g. 122, 124) made an earlier request for NSP information that this subscriber 120 can then share in without any extraneous signaling. Preferably, only the broadcast frame pointer is unicast to the SS 120 as a Subscriber Station Basic Capability Response (SBC-RSP) identifying the scheduled ad-hoc or periodic broadcast, thus unicast signaling air traffic is optimized. In this case, the ad-hoc broadcast provides that the SS does not need to wait for a full cycle time of periodic broadcast, thus reducing ND&S latency and hence NE latency. The ad-hoc broadcast can be scheduled as needed when the next periodic broadcast is too far ahead in time. Also, this advantage allows the base station to lengthen the period of the periodic broadcast so that it is less frequent, or even eliminated, if ad-hoc broadcasting is used.

Thirdly, the present invention can provide that the processor of the BS schedule an ad-hoc broadcast at least M frames ($\leq$N) away from current frame so that other SSs requesting NSP information before this broadcast can re-use the same broadcast, where M is set such that a reasonable ND&S latency is achieved along with optimized signaling traffic capacity through shared re-use of the same broadcast by other SSs. Thus, broadcast signaling air traffic is optimized. Alternatively, M can be set to zero such that the ad-hoc broadcast is sent immediately, but this would increase the average air traffic among several requesting SSs. It should be recognized that in the absence of the present invention's use of ad-hoc broadcasts (such as for low NSP traffic), there will always be periodic broadcasts 117.

Fourthly, the present invention allows a large amount of unicast messaging 114 to be used for optimum latency in high NSP information volume scenarios when there is a small amount of user data traffic. Since the over-the-air interface is under-utilized, the unused bandwidth may be used to further optimize ND&S latency. The NSP information can be unicast to a SS if the NSP information can fit within the Downlink Frame Size, even to the point of consuming nearly all of the Downlink Frame.

Fifthly, the present invention allows ad-hoc broadcast messaging 118 to be used to optimize other delay sensitive signaling and user data traffic capacity even in low NSP information volume scenarios. This prioritizes other delay sensitive signaling and user data traffic over providing NSP information. This allow for more over-the-air bandwidth to be allocated to other delay sensitive signaling traffic and user data traffic at the expense of additional ND&S latency.

Figure 2:
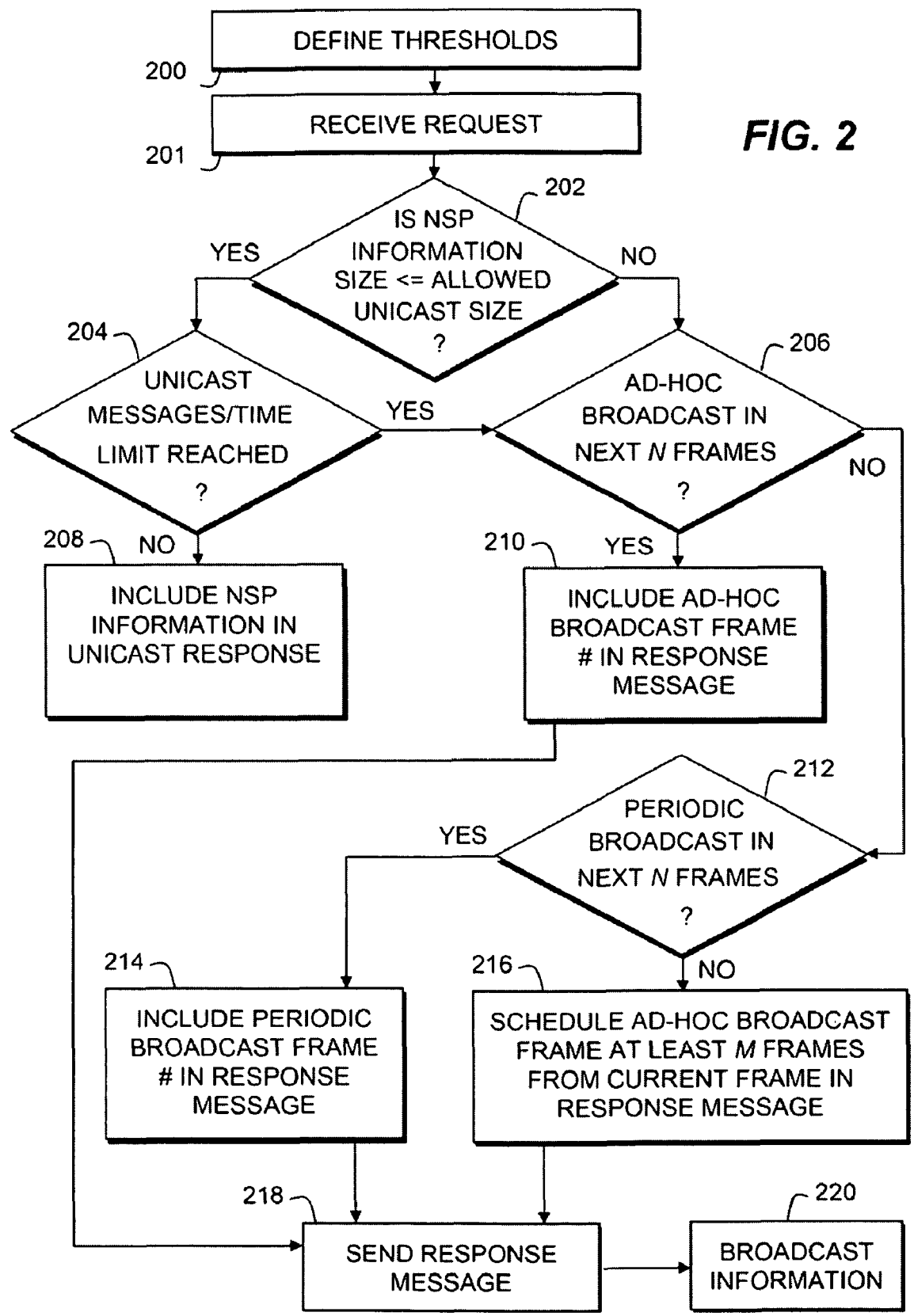
FIG. 2 illustrates a method, in accordance with the present invention.

FIG. 2 illustrates a method for Base Station (BS) messaging for network discovery and selection (ND&S) in a wireless communication network.

The method includes a first step 200 of defining at least one unicast and/or broadcast threshold parameter, which can be defined in any network element of the communication system. In particular, this step could define allowed unicast size thresholds and allowed unicast messages per unit time thresholds for high and low downlink frame utilizations. This at least one parameter defines thresholds to be used to provide the latency and signaling air traffic capacity requirements of the communication network. Specifically, the method includes a threshold for the NSP information size, which can be compared to an allowed unicast message size. Typically a unicast message can take up to half a frame. If the NSP information is greater than this, then unicast messaging would take up too much air traffic. In addition, there can be other unicast messaging to be transmitted other than NSP information, and if the Base station (BS) allowed such a large NSP information size, this other information could not be transmitted in that frame, degrading the latency of this other information. Therefore, the BS could set a first threshold for the NSP information size, typically of less than half a frame. If this threshold is not met, then when NSP information is requested, broadcasting the NSP information would be indicated, in accordance with the present invention. In addition, the AP could set a second threshold for the NSP information size which would be set higher than the first threshold for the NSP information size which would allow for the NSP information to consume more of the downlink frame when the downlink frame is under utilized (for example, there is little other delay sensitive signaling traffic and user data traffic). If the second NSP information size threshold is not exceeded when the downlink frame is under-utilized (i.e. when the downlink frame has a less than normal or average utilization), when requested, unicasting the NSP information would be indicated, in accordance with the present invention.

In addition, a third threshold can be defined for a limit for the number of unicast messages allowed per unit time. If unicasting the NSP information would exceed this limit, then broadcasting the NSP information would be indicated, in accordance with the present invention. A fourth threshold can be defined to allow for a higher limit for the number of unicast messages allowed per unit time when the downlink frame is under utilized. If the fourth threshold to limit the number of unicast message allowed per unit time is not exceeded when the downlink frame is under-utilized, then unicasting the NSP information would be indicated, in accordance with the present invention.

Preferably, the at least one unicast threshold parameter can be changed dynamically for the network, to meet any changing latency requirements or air traffic capabilities.

The method includes a next step 201 of an BS receiving a query or request for system information, such as on the available Network Service Providers (NSPs) from a Subscriber Station (SS) that is undergoing ND&S. This request can be accomplished in a Subscriber Station Basic Capability Request (SBC-REQ), for example.

A next step 202, 204 includes determining the transmission mode for the system information using the at least one threshold parameters that was defined in step 200. This step also includes determining if the system (e.g. network service provider) information (size, frequency, etc.) using the transmission mode exceeds the at least one threshold parameter. This step also includes determining a downlink frame utilization. In the trivial case, if the NSP information is less than the threshold for allowed unicast size 202 and can be sent in less than the limit of allowed unicast messages 204, then the NSP information can be sent in a unicast response 208, such as a Subscriber Station Basic Capability Response (SBC-RSP) for example, as is already known. In this way, the present invention allows a small amount of unicast messaging to be used for optimum latency in low NSP information volume scenarios. What this means is that the NSP information can be unicast to a SS if the NSP information can fit in a reasonable percentage of Downlink Frame Size and if the unicast message rate is within the specified unicast messaging threshold.

However, if the network service provider information exceeds any of the at least one threshold parameter, the method proceeds with the next step 206. For example, in step 202, if there is a high/normal downlink frame utilization and the NSP information size is greater than the first allowed unicast size threshold, or if there is a low downlink frame utilization and the NSP information size is greater than the second allowed unicast size threshold, then the method proceeds with step 206. And in step 204, if there is a high/normal downlink frame utilization and the number of unicast messages/time is greater than the third allowed number of unicast messages/time threshold, or if there is a low downlink frame utilization and the number of unicast messages/time is greater than the fourth allowed unicast messages/time threshold, then the method proceeds with step 206. If none of the above conditions hold, the method proceeds with step 208

A next step 206-216 includes scheduling an ad-hoc broadcast for the network service provider information, as needed, if the network service provider information exceeds any of the at least one threshold parameter. The ad-hoc broadcast is scheduled when no other ad-hoc broadcast or previously scheduled periodic broadcast is scheduled as a Service Identity Information Advertisement (SII-ADV) in the next N frames, where N is set such that a specified maximum ND&S latency is achieved.

Therefore, this step includes first determining 206 whether there is an ad-hoc broadcast already scheduled within N frames, which indicates that another SS made an earlier request for NSP information that this requesting SS can then share without any extraneous signaling by the BS. If there is a pre-scheduled ad-hoc broadcast already scheduled within N frames, then the BS can indicate this to the requesting SS by sending 210 a pointer to the pre-scheduled ad-hoc broadcast frame number containing the NSP information in a short unicast response 218 to the SS, such as in a SBC-RSP for example. The BS then broadcasts 220 the NSP information in the indicated pre-scheduled ad-hoc broadcast frame number for reception by the requesting SS (and the other SS that made the earlier request for NSP information). Preferably, only the broadcast frame pointer is unicast to the SS as a SBC-RSP identifying the pre-scheduled ad-hoc broadcast, thus unicast signaling air traffic is optimized, although it is envisioned that the SBC-RSP could instead include the full NSP information. In this step, the ad-hoc broadcast provides that the SS does not need to wait for a full cycle time of a periodic broadcast, thus reducing ND&S latency and hence NE latency. The ad-hoc broadcast can be scheduled as needed when the next periodic broadcast is too far ahead in time.

If there is no pre-scheduled ad-hoc broadcast within the next N frames, then the method proceeds to check 212 whether there is any periodic broadcast already scheduled within the next N frames. If this is the case, then the BS can indicate this to the requesting SS by sending 214 a pointer to the pre-scheduled periodic broadcast frame number containing the NSP information in a short unicast response 218 to the SS, such as in a SBC-RSP for example. The BS then broadcasts 220 the NSP information in the indicated periodic broadcast frame number for reception by the requesting SS.

If there is no pre-scheduled ad-hoc 206 or periodic 212 broadcast within the next N frames, the present invention can schedule 216 an ad-hoc broadcast at least M frames ($\leq$N) away from current frame. This is done so that other SSs requesting NSP information up to three frames before this newly scheduled broadcast frame is transmitted can then share that same broadcast if possible. M is set such that a reasonable ND&S latency is achieved along with optimized signaling traffic capacity through re-use of the same broadcast by other SSs, thus broadcast signaling air traffic is optimized. Alternatively, M can be set to zero such that the ad-hoc broadcast is sent as soon as possible, but this would increase the average air traffic if there are several requesting SSs.

EXAMPLE

The present invention provides a substantial reduction in average air traffic and latency. Against the prior art use of periodic broadcast only, the present invention provides a Network Discovery & Selection (ND&S) Latency reduction of as much as 95%. For example, assuming a periodic broadcast is done every ten seconds, and an ad-hoc broadcast can be scheduled M=100 frames from the current frame (0.5 second), then the present invention can result in up to a 95% reduction in latency. Against the prior art use of unicast messaging upon every request, the present invention provides a signaling air traffic capacity savings of 88.3%. For example, where one-hundred SSs are performing ND&S uniformly over a period of five seconds, M=100 frames, ten subscribers use one ad-hoc broadcast, thus needing ten broadcasts for one-hundred SSs. When the NSP information is unicast in the SBC-RSP, its size is determined by the NSP-List TLV, Verbose NSP Name TLV, the MAC message overhead (MAC header, message type, CRC) which totals 296 bytes. The length of the information in one-hundred SBC-RSPs=100*296=29600 bytes. Now the SII-ADV size*ten broadcasts=296*10=2960 bytes and there are also 100 unicasts of the SBC-RSP in which the fourteen-byte Broadcast Pointer is sent. So, the total number of bytes is 2960+100*14=4360 bytes. Therefore, the percentage savings provided by the present invention is (29600−4360)/29600*100=85.27%.

Advantageously, the present invention combines usage of unicast, ad-hoc broadcast, and periodic broadcast to favor and optimize latency when there is a low volume of NSP information traffic or a low volume of user-data traffic, and to optimize signaling capacity when there is high volume of NSP information traffic or a high volume of user-data traffic. In addition, the present invention allows the base station to lengthen the period of an existing periodic broadcast so that it is less frequent, or even eliminated, if ad-hoc broadcasting is used.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for communicating system information in a wireless communication network, the method comprising the steps of:
    defining, by a base station, at least one unicast threshold parameter;
    receiving, by the base station, a request for system information;
    determining, by the base station, if the system information exceeds the at least one threshold parameter;
    scheduling, by the base station, an ad-hoc broadcast of the system information if the system information exceeds any of the at least one threshold parameter;
    sending, by the base station, a pointer to the scheduled ad-hoc broadcast of the system information; and
    broadcasting, by the base station, the system information per the schedules
    wherein the scheduling step includes scheduling the ad-hoc broadcast within the next N number of frames from a current frame if no other broadcast transmission of the system information is scheduled therein;
    wherein the scheduling step includes scheduling the ad-hoc broadcast at least M frames from a current frame; and
    wherein $M \leq N$.

2. The method of claim 1 wherein one unicast threshold parameter is an allowed unicast message size.

3. The method of claim 1 wherein one unicast threshold parameter is an allowed unicast message size with respect to a downlink frame utilization.

4. The method of claim 1 wherein one unicast threshold parameter is a number of unicast messages per unit time.

5. The method of claim 1 wherein one unicast threshold parameter is a number of unicast messages per unit time with respect to a downlink frame utilization.

6. The method of claim 1 wherein the system information is network service provider information.

7. The method of claim 1 wherein N is chosen as a latency time limit.

8. The method of claim 1 wherein M is chosen to optimize signaling traffic capacity.

9. The method of claim 1 wherein the sending step includes sending a pointer to a frame number for the scheduled ad-hoc broadcast transmission of the system information.

10. A base station that communicates for system information in a wireless communication network, the base station comprising:
    a receiver operable to receive a request for system information;
    a processor coupled to the receiver, the processor operable to define at least one unicast threshold parameter, determine if the system information exceeds the at least one threshold parameter, and schedule an ad-hoc broadcast of the system information if the system information exceeds any of the at least one threshold parameter; and
    a transmitter coupled to the processor, the transmitter operable to send a pointer to the scheduled ad-hoc broadcast and then to broadcast the system information per the schedule;
    wherein scheduling includes scheduling the ad-hoc broadcast within the next N number of frames from a current frame if no other broadcast transmission of the system information is scheduled therein;
    wherein scheduling includes scheduling the ad-hoc broadcast at least M frames from a current frame; and
    wherein $M \leq N$.

* * * * *